United States Patent
Kang et al.

(10) Patent No.: US 12,098,232 B2
(45) Date of Patent: Sep. 24, 2024

(54) MODIFIED CONJUGATED DIENE-BASED POLYMER, METHOD FOR PREPARING THE SAME AND RUBBER COMPOSITION INCLUDING THE SAME

(71) Applicant: LG Chem, Ltd., Seoul (KR)

(72) Inventors: Suk Youn Kang, Daejeon (KR); Ju Ryang Bae, Daejeon (KR); Seo Won Choi, Daejeon (KR); Tae Chul Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 602 days.

(21) Appl. No.: 17/423,989

(22) PCT Filed: Sep. 25, 2020

(86) PCT No.: PCT/KR2020/013155
§ 371 (c)(1),
(2) Date: Jul. 19, 2021

(87) PCT Pub. No.: WO2021/060942
PCT Pub. Date: Apr. 1, 2021

(65) Prior Publication Data
US 2022/0081496 A1   Mar. 17, 2022

(30) Foreign Application Priority Data
Sep. 25, 2019 (KR) .................. 10-2019-0118069

(51) Int. Cl.
| | | |
|---|---|---|
| *C08F 236/06* | (2006.01) | |
| *C08C 19/22* | (2006.01) | |
| *C08C 19/25* | (2006.01) | |
| *C08F 4/54* | (2006.01) | |
| *C08K 3/04* | (2006.01) | |
| *C08K 3/36* | (2006.01) | |
| *C08L 15/00* | (2006.01) | |
| *B60C 1/00* | (2006.01) | |

(52) U.S. Cl.
CPC .............. *C08F 4/545* (2013.01); *C08C 19/22* (2013.01); *C08C 19/25* (2013.01); *C08F 236/06* (2013.01); *C08K 3/04* (2013.01); *C08K 3/36* (2013.01); *C08L 15/00* (2013.01); *B60C 1/00* (2013.01)

(58) Field of Classification Search
CPC .......... C08C 19/22; C08C 19/25; C08F 4/545
See application file for complete search history.

(56) References Cited

U.S. PATENT DOCUMENTS

| | | | |
|---|---|---|---|
| 10,184,012 B2 | 1/2019 | Bae et al. | |
| 2011/0077325 A1* | 3/2011 | Luo ................. | C08F 136/06 |
| | | | 525/102 |
| 2012/0184677 A1 | 7/2012 | Luo | |
| 2012/0190076 A1 | 7/2012 | Clark et al. | |
| 2014/0018500 A1* | 1/2014 | Luo ................. | C08K 3/06 |
| | | | 525/102 |
| 2015/0050702 A1 | 2/2015 | Clark et al. | |
| 2017/0204205 A1 | 7/2017 | Choi et al. | |
| 2017/0275390 A1* | 9/2017 | Bae ................. | C08F 36/04 |
| 2020/0123277 A1* | 4/2020 | Kim ................ | C08C 19/25 |
| 2020/0308368 A1* | 10/2020 | Kim ................ | C08F 2/38 |

FOREIGN PATENT DOCUMENTS

| | | |
|---|---|---|
| CN | 102639568 A | 8/2012 |
| CN | 103562237 A | 2/2014 |
| CN | 108884270 A | 11/2018 |
| JP | 3175350 B2 | 6/2001 |
| JP | 2012087200 A | 5/2012 |
| JP | 2013060525 A | 4/2013 |
| JP | 2014509686 A | 4/2014 |
| JP | 5646947 B2 | 12/2014 |
| JP | 2016014122 A | 1/2016 |
| KR | 20160065015 A | 6/2016 |
| KR | 20170075662 A | 7/2017 |
| KR | 20180050227 A | 5/2018 |
| KR | 20190044524 A | 4/2019 |
| WO | 2011041534 A1 | 4/2011 |
| WO | 2018084579 A1 | 5/2018 |
| WO | 2019078653 A2 | 4/2019 |

OTHER PUBLICATIONS

International Search Report for PCT/KR2020/013155 mailed Jan. 8, 2021; 3 pgs.
Extended European Search Report and European Search Opinion for European Patent Application No. 20870141.7 dated Feb. 16, 2022, 5 pages.

* cited by examiner

*Primary Examiner* — Robert C Boyle
(74) *Attorney, Agent, or Firm* — Lerner David LLP

(57) ABSTRACT

A neodymium-catalyzed modified conjugated diene-based polymer having excellent affinity with a filler is provided. A method for preparing the same and a rubber composition including the same are also provided. The neodymium-catalyzed modified conjugated diene-based polymer includes a repeating unit derived from a conjugated diene-based monomer; and a functional group derived from a modifier represented by Formula 1 in at least one terminal of a polymer.

14 Claims, No Drawings

MODIFIED CONJUGATED DIENE-BASED POLYMER, METHOD FOR PREPARING THE SAME AND RUBBER COMPOSITION INCLUDING THE SAME

CROSS-REFERENCE TO RELATED APPLICATIONS

The present application is a national stage entry under 35 U.S.C. § 371 of International Application No. PCT/KR2020/013155 filed on Sep. 25, 2020, which claims priority from Korean Patent Application No. 10-2019-0118069, filed on Sep. 25, 2019, the entire contents of which are incorporated herein by reference.

TECHNICAL FIELD

The present invention relates to a neodymium-catalyzed modified conjugated diene-based polymer having excellent affinity with a filler, a method for preparing the same and a rubber composition including the same.

BACKGROUND ART

According to the recent demand for cars having a low fuel consumption ratio, a modified conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or low tan δ or Goodrich heat generation.

Natural rubbers, polyisoprene rubbers, or polybutadiene rubbers are known as rubber materials having low hysteresis loss, but these rubbers may have a limitation of low wet skid resistance. Thus, recently, a conjugated diene-based (co) polymer, such as styrene-butadiene rubbers (hereinafter, referred to as "SBR") or butadiene rubbers (hereinafter, referred to as "BR"), are prepared by emulsion polymerization or solution polymerization to be used as a rubber for tires.

In a case in which the BR or SBR is used as the rubber material for tires, the BR or SBR is typically used by being blended with a filler such as silica or carbon black, to obtain physical properties required for tires. However, since affinity of the Br or SBR with the filler is poor, physical properties such as abrasion resistance, crack resistance, and processability, may rather be reduced.

Thus, as a method of increasing dispersibility of the SBR and the filler such as silica and carbon black, a method of modifying a polymerization active site of a conjugated diene-based polymer obtained by anionic polymerization using organolithium with a functional group capable of interacting with the filler has been proposed. For example, a method of modifying a polymerization active terminal of a conjugated diene-based polymer with a tin-based compound or introducing an amino group, or a method of modifying with an alkoxysilane derivative has been proposed.

Also, as a method of increasing dispersibility of the BR and the filler such as silica and carbon black, a method of modifying a living active terminal with a specific coupling agent or modifier has been developed in a living polymer obtained by coordination polymerization using a catalyst composition which includes a lanthanide rare earth element compound.

Meanwhile, in case of a terminal-modified polymer, affinity with a filler may be improved, and there are advantages in that compounding properties, for example, tensile properties and viscoelasticity properties are improved, but in contrast, there are problems in that compounding processability is largely reduced and processability is poor.

Accordingly, when preparing SBR or BR, a method showing excellent compounding properties and improving processability is required.

PRIOR ART DOCUMENT (Patent Document 1) JP 3175350 B2

DISCLOSURE OF THE INVENTION

Technical Problem

The present invention has been devised to solve the above-mentioned problems of the conventional technique and an object is to provide a neodymium-catalyzed modified conjugated diene-based polymer having excellent affinity with a filler.

In addition, another object of the present invention is to provide a method for preparing the neodymium-catalyzed modified conjugated diene-based polymer.

Also, another object of the present invention is to provide a rubber composition including the neodymium-catalyzed modified conjugated diene-based polymer.

Technical Solution

To solve the above tasks, the present invention provides a neodymium-catalyzed modified conjugated diene-based polymer including a repeating unit derived from a conjugated diene-based monomer; and a functional group derived from a modifier represented by the following Formula 1 in at least one terminal of a polymer:

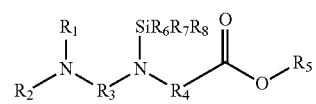

[Formula 1]

in Formula 1, $R_1$ and $R_2$ are each independently a monovalent hetero hydrocarbon group of 1 to 10 carbon atoms, including at least one heteroatom selected from N, S and O; or $R_1$ and $R_2$ are connected with each other to form a heterocyclic group of 2 to 20 carbon atoms together with N, $R_3$ and $R_4$ are each independently a divalent hydrocarbon group of 1 to 10 carbon atoms, $R_5$ is a monovalent hydrocarbon group of 1 to 10 carbon atoms, and $R_6$ to $R_8$ are each independently an alkyl group of 1 to 10 carbon atoms or an alkoxy group of 1 to 10 carbon atoms.

In addition, the present invention provides a method for preparing the neodymium-catalyzed modified conjugated diene-based polymer, including: polymerizing a conjugated diene-based monomer in the presence of a catalyst composition comprising a neodymium compound in a hydrocarbon solvent to prepare an active polymer (S1); and reacting the active polymer with a modifier represented by the following Formula 1 (S2):

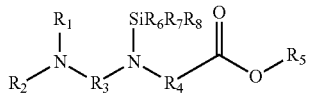

[Formula 1]

in Formula 1,

R₁ and R₂ are each independently a monovalent hetero hydrocarbon group of 1 to 10 carbon atoms, including at least one heteroatom selected from N, S and O; or R₁ and R₂ are connected with each other to form a heterocyclic group of 2 to 20 carbon atoms together with N, R₃ and R₄ are each independently a divalent hydrocarbon group of 1 to 10 carbon atoms, R₅ is a monovalent hydrocarbon group of 1 to 10 carbon atoms, and R₆ to R₈ are each independently an alkyl group of 1 to 10 carbon atoms or an alkoxy group of 1 to 10 carbon atoms.

Also, the present invention provides a rubber composition including the neodymium-catalyzed modified conjugated diene-based polymer and a filler.

Advantageous Effects

The neodymium-catalyzed modified conjugated diene-based polymer according to the present invention includes a functional group derived from a modifier represented by Formula 1 in at least one terminal and has excellent affinity with a filler, and accordingly, if applied in a rubber composition, the compounding properties of the rubber composition may be improved.

In addition, a method for preparing the modified conjugated diene-based polymer according to the present invention includes a step of reacting with a modifier represented by Formula 1, and a functional group derived from the modifier is introduced in at least one terminal, and a neodymium-catalyzed modified conjugated diene-based polymer having excellent affinity with a filler may be prepared.

Also, the rubber composition according to the present invention includes the modified conjugated diene-based polymer and thus, has excellent tensile properties and viscoelasticity properties together with excellent abrasion resistance.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terms and measurement methods used in the present invention may be defined as follows, unless otherwise separately defined.

[Terms]

In the present invention, the term "monovalent hydrocarbon group" may mean a monovalent atomic group obtained by bonding carbon and hydrogen, in a monovalent alkyl group, alkenyl group, alkynyl group, cycloalkyl group, cycloalkyl group including one or more unsaturated bonds, and aryl group. The minimum carbon number of a substituent represented by the monovalent hydrocarbon may be determined according to the type of each substituent.

In the present invention, the term "divalent hydrocarbon group" may mean a divalent atomic group obtained by bonding carbon and hydrogen, in a divalent alkylene group, alkenylene group, alkynylene group, cycloalkylene group, cycloalkylene group including one or more unsaturated bonds and arylene group. The minimum carbon number of a substituent represented by the divalent hydrocarbon may be determined according to the type of each substituent.

In the present invention, the term "alkyl group" may mean a monovalent aliphatic saturated hydrocarbon and may include all of a linear alkyl group such as methyl, ethyl, propyl and butyl; a branched alkyl group such as isopropyl, sec-butyl, tert-butyl and neo-pentyl; and a cyclic saturated hydrocarbon, or a cyclic unsaturated hydrocarbon including one or two or more unsaturated bonds.

In the present invention, the term "alkylene group" may mean a divalent aliphatic saturated hydrocarbon such as methylene, ethylene, propylene and butylene.

In the present invention, the term "monovalent hetero hydrocarbon group" may mean a monovalent atomic group obtained by bonding carbon and hydrogen, in a monovalent alkyl group, alkenyl group, alkynyl group, cycloalkyl group, cycloalkyl group including one or more unsaturated bonds, and aryl group, and substituting a carbon atom in the monovalent atomic group with one or more heteroatoms, wherein the heteroatom may be one or more selected from N, S and O.

In the present invention, the term "heteroalkyl group" is obtained by substituting carbon atoms in an alkyl group with one or more heteroatoms, wherein the heteroatom may be one or more selected from N, S and O.

In the present invention, the term "heterocyclic group" is obtained by substituting carbon atoms in a cycloalkyl group or an aryl group with one or more heteroatoms and may mean, for example, both a heterocycloalkyl group and a heteroaryl group.

In the present invention, the terms "derived repeating unit", "derived unit" and "derived functional group" may mean a component or a structure derived from a material, or the material itself.

In the present invention the term "modification ratio (%)" means the ratio of a modified polymer with respect to an unmodified polymer, if a polymer in which a polymerization active part is present is modified with a modifier, and this may be represented by percent (%) with respect to the total of the modified polymer and the unmodified polymer.

[Measurement Methods]

In the present invention, the "modification ratio (%)" is a value calculated according to Mathematical Formula 1 below using a chromatogram obtained from the measurement of chromatography. The measurement of the chromatography was conducted as follows. For example, a polymer was dissolved in cyclohexane and stored in a mobile phase reservoir of a specimen (prepare in 1.0 mg/ml), and tetrahydrofuran (THF) was stored in another mobile phase reservoir. The mobile phase reservoirs were connected with a dual-head pump, respectively, and first, the solution in the mobile phase reservoir in which the polymer was dissolved was injected into a column filled with a silica absorbent through the pump and an injector with a loop volume of 100 μl. In this case, the pressure of the pump was 450 psi, and an injection flow rate was 0.7 ml/min. Then, after confirming that an unmodified butadiene polymer unit in the polymer from a detector (ELSD, Waters Co.) was not detected any more, based on 5 minutes from the initiation of the injection, the tetrahydrofuran was injected into the column through the pump. In this case, the pressure of the pump was 380 psi, and an injection flow rate was 0.7 ml/min. After confirming that a modified butadiene polymer unit in the polymer according to the injection of tetrahydrofuran from the detector was not detected any more, the injection of a second solvent was finished. Then, from the detected chromatogram results, a modification ratio (%) was calculated according to Mathematical Formula 1 below.

[Mathematical Formula 1]
$$\text{modification ratio (\%)} = \frac{\text{peak area of modified polymer}}{\text{peak area of unmodified polymer} + \text{peak are of modified polymer}} \times 100$$

In Mathematical Formula 1, the peak area of the unmodified polymer unit is the peak area of the chromatogram on a first solution transported to the detector, and the peak area of the modified polymer unit is the peak area of the chromatogram on a second solution transported to the detector.

In the present invention, "1,4-cis bond content" and "1,2-vinyl bond content" may be measured by Fourier transform Infrared spectroscopy (FT-IR). For example, the FT-IR transmittance spectrum of a carbon disulfide solution of a conjugated diene-based polymer prepared in a concentration of 5 mg/mL was measured with carbon disulfide of the same cell as a blank, and then, each content was obtained using the maximum peak value (a, base line) around 1130 $cm^{-1}$ of the measured spectrum, the minimum peak value (b) around 967 $cm^{-1}$ indicating a trans-1,4 bond, the minimum peak value (c) around 911 $cm^{-1}$ indicating a 1,2-vinyl bond, and the minimum peak value (d) around 736 $cm^{-1}$ indicating a cis-1,4 bond.

Neodymium-Catalyzed Modified Conjugated Diene-Based Polymer

The present invention provides a neodymium-catalyzed modified conjugated diene-based polymer having excellent affinity with a filler.

The neodymium-catalyzed modified conjugated diene-based polymer according to an embodiment of the present invention is characterized in including a repeating unit derived from a conjugated diene-based monomer; and a functional group derived from a modifier represented by the following Formula 1 in at least one terminal of a polymer:

[Formula 1]

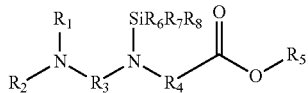

in Formula 1, $R_1$ and $R_2$ are each independently a monovalent hetero hydrocarbon group of 1 to 10 carbon atoms, including at least one heteroatom selected from N, S and O; or $R_1$ and $R_2$ are connected with each other to form a heterocyclic group of 2 to 20 carbon atoms together with N, $R_3$ and $R_4$ are each independently a divalent hydrocarbon group of 1 to 10 carbon atoms, $R_5$ is a monovalent hydrocarbon group of 1 to 10 carbon atoms, and $R_6$ to $R_8$ are each independently an alkyl group of 1 to 10 carbon atoms or an alkoxy group of 1 to 10 carbon atoms.

The modifier represented by Formula 1 according to an embodiment of the present invention may be the compound itself represented by Formula 1, or may include another compound which may modify a conjugated diene-based polymer together with the compound represented by Formula 1.

In an embodiment, since the modifier represented by Formula 1 according to an embodiment of the present invention includes an ester group in a molecule, the reaction activity with a polymer active part is high, the reaction with the polymer active part is smooth, and a functional group derived from the modifier may be easily introduced. Accordingly, a modified conjugated diene-based polymer including the functional group derived from the modifier represented by Formula 1 may have high modification properties.

In another embodiment, the modifier represented by Formula 1 includes an ester group and an amine group in a molecule, but the ester group may be a structure bonded to an N atom by a hydrocarbon group ($R_4$). Accordingly, the functional group derived from the modifier may be more easily introduced into a polymer.

For example, a structure which has a similar structure as the modifier represented by Formula 1 according to the present invention, but in which an ester group is directly connected with an N atom without a hydrocarbon group, $R_4$, as a connecting group, i.e., a compound of an amide group (RC(=O)NR'R", where R, R' and R" are monovalent hydrocarbon groups) type including an ester group reacts with an active polymer by the amide group to modify the active polymer. However, an amide group has low reactivity with an active polymer when compared with an ester group, and it is difficult to easily introduce the functional group derived from the modifier into the polymer, and as a result, a modified polymer prepared from the modifier including an amide group has a poor modification ratio, and the affinity with a filler is insufficient as much as wanted, and as a result, the improving effects of compounding properties may be insignificant.

On the contrary, in the modifier represented by Formula 1 according to the present invention, an ester group and an N atom are connected via a hydrocarbon group ($R_4$), and reaction between a polymer active part and the ester group having excellent reactivity is performed, and accordingly, the functional group derived from the modifier may be easily introduced into a polymer in the high content. Accordingly, the affinity with a filler of the modified conjugated diene-based polymer including the functional group derived from the modifier represented by Formula 1 may be markedly improved, and effects of markedly improving the compounding properties of a rubber composition including the same may be achieved. In another embodiment, the modifier represented by Formula 1 may include one ester group in a molecule. Meanwhile, the ester group has excellent reactivity with respect to the active part of an active polymer, and by the ester group, a modifier may react with the active part of an active polymer to easily introduce the functional group derived from the modifier into the polymer. However, in case of including a large number of ester groups in a modifier molecule, reaction sites which may react with an active polymer increases, and it is advantageous in view of reactivity, but many active polymers may react with one modifier at the same time, and the modification ratio of whole polymers may be low, and thus, the improvement of the affinity with a filler may be insufficient. Accordingly, the improvement of the affinity with a filler may be insufficient, the improvement of compounding properties, for example, rolling resistance (fuel consumption ratio) may be insignificant, and by the formation of a macropolymer, processability may be rather deteriorated.

In addition, the modifier according to an embodiment of the present invention includes a functional group, for example, a tertiary amine group, which may improve affinity with a filler in a molecule, and compounding properties between a polymer and a filler may be improved. Further, by including the tertiary amine group as described above, agglomeration of the filler in a rubber composition may be prevented, and the dispersibility of the filler may be improved. For example, in case of using silica which is one type of inorganic filler as the filler, agglomeration may be easily generated due to the hydrogen bond between hydroxyl groups present at the surface of silica, and the tertiary amine group may inhibit the hydrogen bond between the hydroxyl groups of the silica, thereby improving the dispersibility of the silica. As described above, since the modifier has a structure which may maximize the compounding properties of a modified conjugated diene-based polymer, a modified conjugated diene-based polymer having excellent balance of the physical properties such as abrasion resistance and processability of a rubber composition, may be efficiently prepared.

In another embodiment, in the modifier according to the present invention, a heteroalkyl group or a heterocyclic group is introduced at the positions of $R_1$ and $R_2$ in Formula 1, and the dispersibility of a filler in a rubber composition may be improved. For example, in case of using silica which is one type of an inorganic filler as the filler, agglomeration may be easily generated due to the hydrogen bond between hydroxyl groups present at the surface of the silica. The modifier represented by Formula 1 according to the present invention introduces the heteroalkyl group or the heterocyclic group, which has relatively higher polarity than a hydrocarbon group, and the polar bond with the hydroxyl group of the silica may be induced by the heteroalkyl group or the heterocyclic group, and accordingly, the hydrogen bond between the hydroxyl groups of the silica may be inhibited, and the dispersibility of the silica may be improved.

Particularly, in Formula 1, $R_1$ and $R_2$ may be each independently a heteroalkyl group of 1 to 6 carbon atoms, including at least one heteroatom selected from N, S and O, or $R_1$ and $R_2$ may be connected with each other to form a heterocyclic group of 3 to 10 carbon atoms together with N, $R_3$ and $R_4$ may be each independently an alkylene group of 1 to 6 carbon atoms, $R_5$ may be an alkyl group of 1 to 6 carbon atoms, and $R_6$ to $R_8$ may be each independently an alkyl group of 1 to 6 carbon atoms or an alkoxy group of 1 to 6 carbon atoms, and more particularly, in Formula 1, $R_1$ and $R_2$ may be each independently an alkyl group of 1 to 3 carbon atoms, including O, or $R_1$ and $R_2$ may be connected with each other to form a heterocyclic group of 3 to 6 carbon atoms together with N, where the heterocyclic group may include O or S in addition to N, $R_3$ and $R_4$ may be each independently an alkylene group of 1 to 3 carbon atoms, $R_5$ may be an alkyl group of 1 to 6 carbon atoms, and $R_6$ to $R_8$ may be each independently an alkyl group of 1 to 3 carbon atoms.

In case where $R_6$ to $R_8$ are each independently an alkyl group in Formula 1, Formula 1 may include a protected amine group in a molecule, and the protected amine group may be introduced into the polymer via the reaction of an ester group in a modifier and the active part of an active polymer. Then, by removing a protecting group from the protected amine group, a secondary amine which is a functional group having affinity with a filler may be formed, and the affinity of a polymer with a filler may be improved even further.

More particularly, the modifier represented by Formula 1 may be one or more selected from the group consisting of the compounds represented by Formula 1-1 to Formula 1-3 below.

[Formula 1-1]

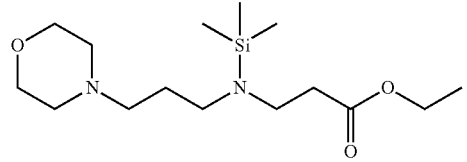

[Formula 1-2]

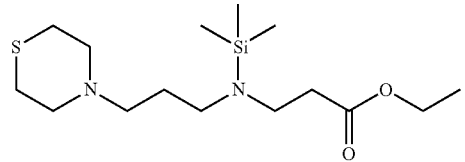

[Formula 1-3]

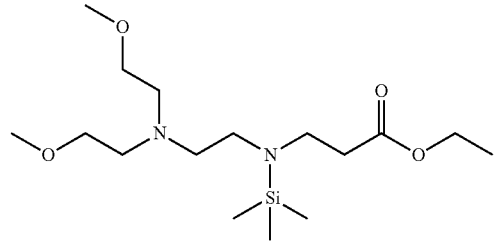

Meanwhile, the neodymium-catalyzed modified conjugated diene-based polymer in the present invention may represent a modified conjugated diene-based polymer including an organometal part derived from a catalyst composition including a neodymium compound, i.e., activated from a catalyst, and the modified conjugated diene-based polymer may be a butadiene homopolymer such as a modified polybutadiene or a modified butadiene copolymer such as a butadiene-isoprene copolymer.

Particularly, the neodymium-catalyzed modified conjugated diene-based polymer includes a repeating unit derived from a conjugated diene-based monomer, and in this case, if the neodymium-catalyzed modified conjugated diene-based polymer is a modified butadiene copolymer, may include a repeating unit derived from another conjugated diene-based monomer together with the repeating unit derived from the conjugated diene-based monomer.

More particularly, the neodymium-catalyzed modified conjugated diene-based polymer may include 80 wt % to 100 wt % of a repeating unit derived from a 1,3-butadiene monomer and selectively 20 wt % or less of a repeating unit derived from another conjugated diene-based monomer which is copolymerizable with 1,3-butadiene. Within the ranges, the cis 1,4-bond content may be controlled in the above-described range. In this case, the 1,3-butadiene monomer may include 1,3-butadienes such as 1,3-butadiene, and 2,3-dimethyl-1,3-butadiene, or derivatives thereof, and another conjugated diene-based monomer copolymerizable with 1,3-butadiene may include 2-methyl-1,3-pentadiene, 1,3-pentadiene, 3-methyl-1,3-pentadiene, 4-methyl-1,3-pentadiene, 1,3-hexadiene or 2,4-hexadiene, and any one among them or compounds of two or more thereof may be used.

More particularly, the neodymium-catalyzed modified conjugated diene-based polymer in the present invention may be a neodymium-catalyzed modified butadiene-based polymer including a repeating unit derived from a 1,3-butadiene monomer.

In the present invention, the activated organometal part of a conjugated diene-based polymer may be an activated organometal part at the terminal of a conjugated diene-based polymer (activated organometal part at the terminal of a molecular chain), an activated organometal part in a main chain, or an activated organometal part in a side chain, and among them, in case of obtaining an activated organometal part of a conjugated diene-based polymer by anionic polymerization or coordination anionic polymerization, the organometal part may be an activated organometal part at the terminal.

In addition, the neodymium-catalyzed modified conjugated diene-based polymer may have the cis-1,4 bond content of a conjugated diene part measured through Fourier-transform infrared spectroscopy (FT-IR) of 96% or more, particularly 97% or more, more particularly, 98% or more. If the modified conjugated diene-based polymer is applied in a rubber composition, the abrasion resistance, crack resistance and ozone resistance of the rubber composition may be improved.

In addition, the neodymium-catalyzed modified conjugated diene-based polymer may have the 1,2-vinyl bond content of a conjugated diene part measured through Fourier-transform infrared spectroscopy of 4 wt % or less, particularly, 3 wt % or less, more particularly, 2 wt % or less. If the 1,2-vinyl bond content in the polymer is greater than 4 wt %, the abrasion resistance, crack resistance and ozone resistance of a rubber composition including the same may be deteriorated.

In addition, the modified conjugated diene-based polymer of the present invention may have a modification ratio (%) calculated from Mathematical Formula 1 as defined above of 20% or more, particularly, 20% or more and 60% or less, and within this range, affinity with a filler may be excellent, and if applied in a rubber composition, compounding properties may be excellent.

In addition, the modified conjugated diene-based polymer according to an embodiment of the present invention may have a mooney viscosity (MV) at 100° C. of 20 to 100, particularly, 30 to 80, 35 to 75, or 40 to 70. The modified conjugated diene-based polymer according to the present invention has a mooney viscosity in the above-described range, and may have excellent processability.

In the present invention, the mooney viscosity was measured by using a mooney viscometer, for example, MV2000E of Monsanto Co. using Large Rotor at a rotor speed of 2±0.02 rpm at 100° C. Particularly, a polymer was stood at room temperature (23±5° C.) for 30 minutes or more, and 27±3 g was collected and put in a die cavity, and then, Platen was operated, and the mooney viscosity was measured while applying torque.

In addition, the modified conjugated diene-based polymer may have molecular weight distribution (Mw/Mn) of 2.0 to 3.5, more particularly, molecular weight distribution of 2.5 to 3.5, 2.5 to 3.2 or 2.6 to 3.0.

In the present invention, the molecular weight distribution of the modified conjugated diene-based polymer may be calculated from the ratio (Mw/Mn) of the weight average molecular weight (Mw) to the number average molecular weight (Mn). In this case, the number average molecular weight (Mn) is a common average of the molecular weight of individual polymer, which is calculated by measuring the molecular weights of n polymer molecules, obtaining the total of the molecular weights, and dividing the total by n, and the weight average molecular weight (Mw) represents the molecular weight distribution a polymer composition. All average molecular weights may be represented by gram per mole (g/mol). In addition, each of the weight average molecular weight and the number average molecular weight may mean a polystyrene converted molecular weight analyzed by gel permeation chromatography (GPC).

The modified conjugated diene-based polymer according to an embodiment of the present invention may satisfy the molecular weight distribution conditions and at the same time, have a weight average molecular weight (Mw) of $3 \times 10^5$ to $1.5 \times 10^6$ g/mol, and a number average molecular weight (Mn) of $1.0 \times 10^5$ to $5.0 \times 10^5$ g/mol, and within these ranges, if applied in a rubber composition, tensile properties are excellent, processability is excellent, the workability of a rubber composition is improved, mulling and kneading are easy, and effects of excellent mechanical properties and balance of physical properties of the rubber composition may be achieved. The weight average molecular weight may be, for example, $5 \times 10^5$ g/mol to $1.2 \times 10^6$ g/mol, or $5 \times 10^5$ g/mol to $8 \times 10^5$ g/mol, and the number average molecular weight may be, for example, $1.5 \times 10^5$ to $3.5 \times 10^5$ g/mol, or $2.0 \times 10^5$ to $2.7 \times 10^5$ g/mol.

More particularly, if the modified conjugated diene-based polymer according to an embodiment of the present invention satisfies the weight average molecular weight (Mw) and the number average molecular weight (Mn) conditions together with the molecular weight distribution, and if applied in a rubber composition, tensile properties, viscoelasticity properties and processability to the rubber composition may be excellent, and excellent effects on the balance between physical properties may be achieved.

Method for Preparing Neodymium-Catalyzed Modified Conjugated Diene-Based Polymer In addition, the present invention provides a method for preparing the neodymium-catalyzed modified conjugated diene-based polymer.

The preparation method according to an embodiment of the present invention is characterized in including: polymerizing a conjugated diene-based monomer in the presence of a catalyst composition including a neodymium compound in a hydrocarbon solvent to prepare an active polymer (S1); and reacting the active polymer with a modifier represented by Formula 1 (S2) below.

[Formula 1]

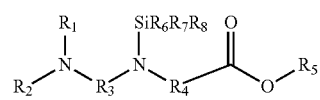

In Formula 1, $R_1$ to $R_8$ are the same as defined above.

Step (S1) is a step for preparing an active polymer including an activated organometal part derived from a catalyst composition, and may be performed by polymerizing a conjugated diene-based monomer and a modification monomer in the presence of a catalyst composition in a hydrocarbon solvent.

Here, the conjugated diene-based monomer may include 1,3-butadiene monomer defined above and another conjugated diene-based monomer which is copolymerizable therewith, for example, 1,3-butadiene, 2,3-dimethyl-1,3-butadiene or 2-ethyl-1,3-butadiene, or 1,3-butadiene, 2,3-dimethyl-1,3-butadiene or 2-ethyl-1,3-butadiene, and 2-methyl-1,3-pentadiene, 1,3-pentadiene, 3-methyl-1,3-pentadiene, 4-methyl-1,3-pentadiene, 1,3-hexadiene or 2,4-hexadiene.

The hydrocarbon solvent is not specifically limited, but may be, for example, one or more selected from the group consisting of n-pentane, n-hexane, n-heptane, isooctane, cyclohexane, toluene, benzene and xylene.

The catalyst composition may be used in an amount such that the neodymium compound is included in 0.1 mmol to 0.5 mmol based on total 100 g of the conjugated diene-based monomer, and may particularly be used in an amount such that the neodymium compound is included in 0.1 mmol to 0.4 mmol, more particularly, 0.1 mmol to 0.25 mmol based on total 100 g of the conjugated diene-based monomer.

In addition, the neodymium compound may include carboxylates thereof (e.g., neodymium acetate, neodymium acrylate, neodymium methacrylate, neodymium gluconate, neodymium citrate, neodymium fumarate, neodymium lactate, neodymium maleate, neodymium oxalate, neodymium 2-ethylhexanoate, or neodymium neodecanoate); organophosphates thereof (e.g., neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis(2-ethylhexyl) phosphate, or neodymium didecyl phosphate); organophosphonates thereof (e.g., neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, or neodymium octadecyl phosphonate); organophosphinates thereof (e.g., neodymium butylphosphinate, neodymium pentylphosphinate, neodymium hexylphosphinate, neodymium heptylphosphinate, neodymium octylphosphinate, neodymium (1-methylheptyl)phosphinate, or neodymium (2-ethylhexyl)phosphinate); carbamates thereof (e.g., neodymium dimethylcarbamate, neodymium diethylcarbamate, neodymium diisopropylcarbamate, neodymium dibutylcarbamate, or neodymium dibenzylcarbamate); dithiocarbamates thereof (e.g., neodymium dimethyldithiocarbamate, neodymium diethyldithiocarbamate, neodymium diisopropyldithiocarbamate, or neodymium dibutyldithiocarbamate); xanthates thereof (e.g., neodymium methylxanthate, neodymium ethylxanthate, neodymium isopropylxanthate, neodymium butylxanthate, or neodymium benzylxanthate); β-diketonates thereof (e.g., neodymium acetylacetonate, neodymium trifluoroacetylacetonate, neodymium hexafluoroacetylacetonate, or neodymium benzoylacetonate); alkoxides or allyloxides thereof (e.g., neodymium methoxide, neodymium ethoxide, neodymium isopropoxide, neodymium phenoxide, or neodymium nonylphenoxide); halides or pseudo-halides thereof (e.g., neodymium fluoride, neodymium chloride, neodymium bromide, neodymium iodide, neodymium cyanide, neodymium cyanate, neodymium thiocyanate, or neodymium azide); oxyhalides thereof (e.g., neodymium oxyfluoride, neodymium oxychloride, or neodymium oxybromide); or organoneodymium-containing compounds including one or more neodymium-carbon bonds (e.g., $Cp_3Nd$, $Cp_2NdR$, $Cp_2NdCl$, $CpNdCl_2$, CpNd (cyclooctatetraene), $(C_5Me_5)_2NdR$, $NdR_3$, $Nd(allyl)_3$, or $Nd(allyl)_2Cl$, where R represents a hydrocarbyl group), and may include any one thereof or mixtures of two or more thereof.

Particularly, the neodymium compound may include a neodymium compound represented by Formula 2 below.

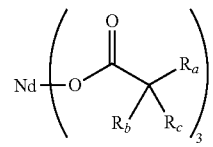

[Formula 2]

In Formula 2, $R_a$ to $R_c$ are each independently hydrogen or an alkyl group of 1 to 12 carbon atoms, but all $R_a$ to $R_c$ are not hydrogen at the same time.

More particularly, the neodymium compound may be one or more selected from the group consisting of Nd(2-ethylhexanoate)$_3$, Nd(2,2-dimethyl decanoate)$_3$, Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decanoate)$_3$, Nd(2-ethyl-2-butyl decanoate)$_3$, Nd(2-ethyl-2-hexyl decanoate)$_3$, Nd(2-propyl-2-butyl decanoate)$_3$, Nd(2-propyl-2-hexyl decanoate)$_3$, Nd(2-propyl 2 isopropyl decanoate)$_3$, Nd(2 butyl 2 hexyl decanoate)$_3$, Nd(2-hexyl-2-octyl decanoate)$_3$, Nd(2,2-diethyl octanoate)$_3$, Nd(2,2-dipropyl octanoate)$_3$, Nd(2,2-dibutyl octanoate)$_3$, Nd(2,2-dihexyl octanoate)$_3$, Nd(2-ethyl-2-propyl octanoate)$_3$, Nd(2-ethyl. 2 hexyl octanoate)$_3$, Nd(2,2-diethyl nonanoate)$_3$, Nd(2,2-dipropyl nonanoate)$_3$, Nd(2,2-dibutyl nonanoate)$_3$, Nd(2,2-dihexyl nonanoate)$_3$, Nd(2-ethyl-2-propyl nonanoate)$_3$, and Nd(2-ethyl-2-hexyl nonanoate)$_3$.

In addition, in another embodiment, in consideration of excellent solubility in the solvent without a concern for oligomerization, a conversion ratio to a catalytically active species, and the resulting excellent catalytic activity improvement effects, the neodymium compound may particularly be a neodymium compound of Formula 2, where $R_a$ is an alkyl group of 4 to 12 carbon atoms, and $R_b$ and $R_c$ are each independently hydrogen or an alkyl group of 2 to 8 carbon atoms, but $R_b$ and $R_c$ are not hydrogen at the same time.

In a more particular embodiment, in Formula 2, $R_a$ may be an alkyl group of 6 to 8 carbon atoms, and $R_b$ and $R_c$ may be each independently hydrogen or an alkyl group of 2 to 6 carbon atoms, where $R_b$ and $R_c$ may not be hydrogen at the same time. Particular examples of the neodymium compound may be one or more selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl propyl decanoate)$_3$, Nd(2-ethyl-2-butyl decanoate)$_3$, Nd(2-ethyl-2-hexyl decanoate)$_3$, Nd(2-propyl-2-butyl decanoate)$_3$, Nd(2-propyl-2-hexyl decanoate)$_3$, Nd(2-propyl-2 isopropyl decanoate)$_3$, Nd(2-butyl-2-hexyl decanoate)$_3$, Nd(2-hexyl 2-octyl decanoate)$_3$, Nd(2-t-butyl decanoate)$_3$, Nd(2,2-diethyl octanoate)$_3$, Nd(2,2-dipropyl octanoate)$_3$, Nd(2,2-dibutyl octanoate)$_3$, Nd(2,2-dihexyl octanoate)$_3$, Nd(2-ethyl propyl octanoate)$_3$, Nd(2-ethyl 2 hexyl octanoate)$_3$, Nd(2, 2-diethyl nonanoate)$_3$, Nd(2,2-dipropyl nonanoate)$_3$, Nd(2, 2-dibutyl nonanoate)$_3$, Nd(2,2-dihexyl nonanoate)$_3$, Nd(- ethyl-2-propyl nonanoate)₃, and Nd(2-ethyl-2-hexyl nonanoate)₃, and among them, the neodymium compound may be at least one selected from the group consisting of Nd(2,2-diethyl decanoate)₃, Nd(2,2-dipropyl decanoate)₃, Nd(2,2-dibutyl decanoate)₃, Nd(2,2-dihexyl decanoate)₃, and Nd(2,2-dioctyl decanoate)₃.

More particularly, in Formula 2, $R_a$ may be an alkyl group of 6 to 8 carbon atoms, and $R_b$ and $R_c$ may be each independently an alkyl group of 2 to 6 carbon atoms.

As described above, since the neodymium compound represented by Formula 2 includes a carboxylate ligand including alkyl groups of various lengths having 2 or more carbon atoms as a substituent at an α (alpha) position, coagulation phenomenon of the compound may be blocked by inducing steric changes around the neodymium central metal, and accordingly, effects of suppressing oligomerization may be achieved. Also, since the neodymium compound has high solubility in the solvent, and the ratio of neodymium located at the central portion, which has difficulties in conversion to the catalytically active species, is reduced, effects of a high conversion ratio to the catalytically active species is achieved.

In addition, the neodymium compound according to an embodiment of the present invention may have a solubility of about 4 g or more per 6 g of a polar solvent at room temperature (25° C.)

In the present invention, the solubility of the neodymium compound denotes a degree to which the neodymium compound is clearly dissolved without turbidity phenomenon, wherein since the neodymium compound has high solubility as described above, excellent catalytic activity may be achieved.

Also, the neodymium compound according to an embodiment of the present invention may be used in the form of a reactant with a Lewis base. The reactant may improve the solubility of the neodymium compound in the solvent due to the Lewis base and may achieve the effects of storing in a stable state for a long period of time. The Lewis base, for example, may be used in a ratio of 30 mol or less or 1 mol to 10 mol per 1 mol of the neodymium. Examples of the Lewis base may be acetylacetone, tetrahydrofuran, pyridine, N,N-dimethylformamide, thiophene, diphenyl ether, triethylamine, an organic phosphorus compound, or a monohydric or dihydric alcohol.

Meanwhile, the catalyst composition may further include at least one of an alkylating agent, a halide, and a conjugated diene-based monomer in addition to the neodymium compound.

That is, the catalyst composition according to an embodiment of the present invention includes a neodymium compound and may further include at least one of an alkylating agent, a halide, and a conjugated diene-based monomer.

Hereinafter, the (a) alkylating agent, the (b) halide, and the (c) conjugated diene-based monomer will be separately described in detail.

(a) Alkylating Agent

The alkylating agent is an organometallic compound that may transfer a hydrocarbyl group to another metal, wherein it may act as a co-catalyst. The alkylating agent may be used without specific limitation as long as it is commonly used as an alkylating agent during the preparation of a diene-based polymer, and, for example, may be an organometallic compound, which is soluble in a polymerization solvent and contains a metal-carbon bond, such as an organoaluminum compound, an organomagnesium compound, and an organolithium compound.

Particularly, the organoaluminum compound may include alkylaluminum such as trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, and trioctylaluminum; dihydrocarbylaluminum hydride such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, or benzyl-n-octylaluminum hydride; and hydrocarbylaluminum dihydride such as ethylaluminum dihydride, n-propylaluminum dihydride, isopropylaluminum dihydride, n-butylaluminum dihydride, isobutylaluminum dihydride, or n-octylaluminum dihydride. The organomagnesium compound may include an alkyl magnesium compound such as diethylmagnesium, di-n-propylmagnesium, diisopropylmagnesium, dibutylmagnesium, dihexylmagnesium, diphenylmagnesium, or dibenzylmagnesium, and the organolithium compound may include an alkyl lithium compound such as n-butyllithium.

Also, the organoaluminum compound may be aluminoxane.

The aluminoxane may be prepared by reacting a trihydrocarbylaluminum-based compound with water, and may particularly be linear aluminoxane of Formula 3a below or cyclic aluminoxane of Formula 3b below.

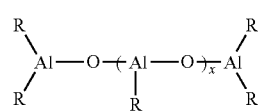
[Formula 3a]

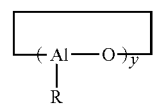
[Formula 3b]

In Formulae 3a and 3b, R is a monovalent organic group bonded to an aluminum atom via a carbon atom, and may be a hydrocarbyl group, and x and y may be each independently an integer of 1 or more, particularly 1 to 100, more particularly 2 to 50.

More particularly, the aluminoxane may include methylaluminoxane (MAO), modified methylaluminoxane (MAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclopentylaluminoxane, phenylaluminoxane, and 2,6-dimethylphenylaluminoxane, and any one thereof or mixtures of two or more thereof may be used.

In addition, the modified methylaluminoxane may be one in which a methyl group of methylaluminoxane is substituted with a formula group (R), particularly, a hydrocarbon group of 2 to 20 carbon atoms, and may particularly be a compound represented by Formula 4 below.

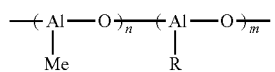

[Formula 4]

In Formula 4, R is the same as defined above, and m and n may be each independently an integer of 2 or more. Also, in Formula 4, Me represents a methyl group.

Particularly, in Formula 4, R may be an alkyl group of 2 to 20 carbon atoms, a cycloalkyl group of 3 to 20 carbon atoms, an alkenyl group of 2 to 20 carbon atoms, a cycloalkenyl group of 3 to 20 carbon atoms, an aryl group of 6 to 20 carbon atoms, an arylalkyl group of 7 to 20 carbon atoms, an alkylaryl group of 7 to 20 carbon atoms, an allyl group, or an alkynyl group of 2 to 20 carbon atoms, may particularly be an alkyl group of 2 to 20 carbon atoms such as an ethyl group, an isobutyl group, a hexyl group, and an octyl group, and may more particularly be an isobutyl group.

More particularly, the modified methylaluminoxane may be one in which about 50 mol % to 90 mol % of the methyl group of the methylaluminoxane is substituted with the above-described hydrocarbon group. If the amount of the hydrocarbon group substituted in the modified methylaluminoxane is within the above range, the alkylation may be promoted and the catalytic activity may be increased.

The modified methylaluminoxane may be prepared by a common method, and may particularly be prepared using trimethylaluminum and an alkylaluminum except for trimethylaluminum. In this case, the alkylaluminum may be triisopropylaluminum, triethylaluminum, trihexylaluminum, or trioctylaluminum, and any one thereof or a mixture of two or more thereof may be used.

In addition, the catalyst composition according to an embodiment of the present invention may include the alkylating agent in a molar ratio of 1 to 200, particularly 1 to 100, more particularly 3 to 20 based on 1 mol of the lanthanide rare earth element-containing compound. If the alkylating agent is included in a molar ratio of greater than 200, catalytic reaction control is not easy during the preparation of a polymer, and an excessive amount of the alkylating agent may induce side reactions.

(b) Halide

The halide is not specifically limited, but, for example, may include elemental halogen, an interhalogen compound, hydrogen halide, an organic halide, a non-metal halide, a metal halide, and an organic metal halide, and any one thereof or a mixture of two or more thereof may be used. Among them, in consideration of catalytic activity enhancement and the resulting improvement effect in reactivity, any one selected from the group consisting of an organic halide, a metal halide, and an organic metal halide, or mixtures of two or more thereof may be used as the halide.

The elemental halogen may include fluorine, chlorine, bromine, or iodine.

Also, the interhalogen compound may include iodine monochloride, iodine monobromide, iodine trichloride, iodine pentafluoride, iodine monofluoride, or iodine trifluoride.

Furthermore, the hydrogen halide may include hydrogen fluoride, hydrogen chloride, hydrogen bromide, or hydrogen iodide.

Also, the organic halide may include t-butyl chloride (t-BuCl), t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzyliene bromide, methyltrichlorosilane, phenyltrichlorosilane, dimethyldichlorosilane, diphenyldichlorosilane, trimethylchlorosilane (TMSCl), benzoyl chloride, benzoyl bromide, propionyl chloride, propionyl bromide, methyl chloroformate, methyl bromoformate, iodomethane, diiodomethane, triiodomethane (also referred to as 'iodoform'), tetraiodomethane, 1-iodopropane, 2-iodopropane, 1,3-diiodopropane, t-butyl iodide, 2,2-dimethyl-1-iodopropane (also referred to as 'neopentyl iodide'), allyl iodide, iodobenzene, benzyl iodide, diphenylmethyl iodide, triphenylmethyl iodide, benzylidene iodide (also referred to as 'benzal iodide'), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, and methyl iodoformate.

Furthermore, the non-metal halide may include phosphorous trichloride, phosphorous tribromide, phosphorous pentachloride, phosphorous oxychloride, phosphorous oxybromide, boron trifluoride, boron trichloride, boron tribromide, silicon tetrafluoride, silicon tetrachloride (SiCl$_4$), silicon tetrabromide, arsenic trichloride, arsenic tribromide, selenium tetrachloride, selenium tetrabromide, tellurium tetrachloride, tellurium tetrabromide, silicon tetraiodide, arsenic triiodide, tellurium tetraiodide, boron triiodide, phosphorous triiodide, phosphorous oxyiodide, and selenium tetraiodide.

Also, the metal halide may include tin tetrachloride, tin tetrabromide, aluminum trichloride, aluminum tribromide, antimony trichloride, antimony pentachloride, antimony tribromide, aluminum trifluoride, gallium trichloride, gallium tribromide, gallium trifluoride, indium trichloride, indium tribromide, indium trifluoride, titanium tetrachloride, titanium tetrabromide, zinc dichloride, zinc dibromide, zinc difluoride, aluminum triiodide, gallium triiodide, indium triiodide, titanium tetraiodide, zinc diiodide, germanium tetraiodide, tin tetraiodide, tin diiodide, antimony triiodide, and magnesium diiodide.

Furthermore, the organic metal halide may include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride (EASC), isobutylaluminum sesquichloride, methylmagnesium chloride, methylmagnesium bromide, ethylmagnesium chloride, ethylmagnesium bromide, n-butylmagnesium chloride, n-butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, di-n-butyltin dichloride, di-n-butyltin dibromide, tri-n-butyltin chloride, tri-n-butyltin bromide, methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, and di-t-butyl tin diiodide.

Also, the catalyst composition according to an embodiment of the present invention may include the halide in an amount of 1 mol to 20 mol, particularly 1 mol to 5 mol, more particularly 2 mol to 3 mol based on 1 mol of the lanthanide rare earth element-containing compound. If the halide is included in an amount of greater than 20 mol, catalytic reaction control is not easy and an excessive amount of the halide may induce side reactions.

Furthermore, the catalyst composition according to an embodiment of the present invention may include a non-coordinating anion-containing compound or a non-coordinating anion precursor compound instead of the halide or with the halide.

Particularly, in the compound containing a non-coordinating anion, the non-coordinating anion is a sterically bulky anion that does not form a coordination bond with an active center of a catalyst system due to steric hindrance, wherein the non-coordinating anion may be a tetraarylborate anion or a fluorinated tetraarylborate anion. Also, the compound containing a non-coordinating anion may include a counter cation, for example, a carbonium cation such as a triarylcarbonium cation; an ammonium cation such as N,N-dialkyl anilinium cation, or a phosphonium cation, in addition to the above-described non-coordinating anion. More particularly, the compound containing a non-coordinating anion may include triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, and N,N-dimethylanilinium tetrakis[3,5-bis(trifluoromethyl)phenyl]borate.

Also, the non-coordinating anion precursor, as a compound capable of forming a non-coordinating anion under the reaction conditions, may include a triaryl boron compound ($BE_3$, where E is a strong electron-withdrawing aryl group such as a pentafluorophenyl group and a 3,5-bis(trifluoromethyl)phenyl group).

(c) Conjugated Diene-Based Monomer

Also, the catalyst composition may further include a conjugated diene-based monomer, and, since the catalyst composition is used in the form of a preforming or premix catalyst composition in which a portion of the conjugated diene-based monomer used in the polymerization reaction is pre-polymerized by being premixed with the catalyst composition for polymerization, catalyst composition activity may not only be improved, but a conjugated diene-based polymer thus prepared may be stabilized.

In the present invention, the expression "preforming" may denote that, in a case in which a catalyst composition including a lanthanide rare earth element-containing compound, an alkylating agent, and a halide, that is, a catalyst system includes diisobutylaluminum hydride (DIBAH), a small amount of a conjugated diene-based monomer such as 1,3-butadiene, is added to reduce the possibility of producing various catalytically active species, and pre-polymerization is performed in the catalyst composition system with the addition of the 1,3-butadiene. Also, the expression "premix" may denote a state in which each compound is uniformly mixed in the catalyst composition system without being polymerized.

In this case, with respect to the conjugated diene-based monomer used in the preparation of the catalyst composition, some amount within a total amount range of the conjugated diene-based monomer used in the polymerization reaction may be used, for example, the conjugated diene-based monomer may be used in an amount of 1 mol to 100 mol, particularly, 10 mol to 50 mol, or 20 mol to 50 mol based on mol of the lanthanide rare earth element-containing compound.

The catalyst composition according to an embodiment of the present invention may be prepared by sequentially mixing the above-described lanthanide rare earth element-containing compound and at least one of the alkylating agent, the halide, and the conjugated diene-based monomer, particularly, the lanthanide rare earth element-containing compound, the alkylating agent, the halide, and selectively the conjugated diene-based monomer, in an organic solvent. In this case, the organic solvent may be a nonpolar solvent that is not reactive with the constituent components of the catalyst composition. Particularly, the nonpolar solvent may include linear, branched, or cyclic aliphatic hydrocarbon of 5 to 20 carbon atoms such as n-pentane, n-hexane, n-heptane, n-octane, n-nonane, n-decane, isopentane, isohexane, isopentane, isooctane, 2,2-dimethylbutane, cyclopentane, cyclohexane, methylcyclopentane, and methylcyclohexane; a mixture solvent of aliphatic hydrocarbon of 5 to 20 carbon atoms such as petroleum ether or petroleum spirits, and kerosene; or an aromatic hydrocarbon-based solvent such as benzene, toluene, ethylbenzene, and xylene, and any one thereof or a mixture of two or more thereof may be used. More particularly, the nonpolar solvent may more particularly be the above-described linear, branched, or cyclic aliphatic hydrocarbon of 5 to 20 carbon atoms or the above-described mixture solvent of aliphatic hydrocarbon, and further more particularly, n-hexane, cyclohexane, or a mixture thereof.

Also, the organic solvent may be suitably selected depending on a type of the constituent components constituting the catalyst composition, particularly, the alkylating agent.

Particularly, since alkylaluminoxane such as methylaluminoxane (MAO) and ethylaluminoxane, as the alkylating agent, is not easily dissolved in an aliphatic hydrocarbon-based solvent, an aromatic hydrocarbon-based solvent may be suitably used.

In addition, if a modified methylaluminoxane is used as the alkylating agent, an aliphatic hydrocarbon-based solvent may be suitably used. In this case, since a single solvent system may be realized with an aliphatic hydrocarbon-based solvent such as hexane, mainly used as a polymerization solvent, it may be more advantageous to the polymerization reaction. Also, the aliphatic hydrocarbon-based solvent may promote catalytic activity, and may further improve reactivity by the catalytic activity.

Meanwhile, the organic solvent may be used in 20 mol to 20,000 mol, more particularly, 100 mol to 1,000 mol based on 1 mol of the neodymium compound.

Meanwhile, the polymerization in step 1 may be performed by continuous-type polymerization in a polymerization reactor including at least two reactors, or may be performed in a batch-type reactor.

In addition, the polymerization may be a polymerization with heating, an isothermal polymerization, or a polymerization at a constant temperature (adiabatic polymerization).

Herein, the constant temperature polymerization denotes a polymerization method including a step of performing polymerization not by optionally applying heat but with its own reaction heat after the catalyst composition is injected, the polymerization with heating denotes a polymerization method in which the temperature is increased by optionally applying heat after the catalyst composition is injected, and the isothermal polymerization denotes a polymerization method in which the temperature of the polymer is constantly maintained by taking away heat or applying heat after the catalyst composition is injected.

In addition, the polymerization may be performed by coordination anionic polymerization or radical polymerization, may particularly be bulk polymerization, solution polymerization, suspension polymerization, or emulsion polymerization, more particularly, solution polymerization.

The polymerization may be performed in a temperature range of −20° C. to 200° C., particularly in a temperature range of 50° C. to 150° C., more particularly 10° C. to 120° C. or 60° C. to 90° C. for 15 minutes to 3 hours. If the temperature during the polymerization is greater than 200° C., it is difficult to sufficiently control the polymerization reaction and the cis-1,4 bond content of the produced diene-based polymer may be decreased, and, if the temperature is less than −20° C., polymerization rate and efficiency may be reduced.

Also, in the preparation method of a conjugated diene-based polymer according to an embodiment of the present invention, after preparing an active polymer, a step of terminating polymerization by further using an additive, for example, a reaction terminating agent for the completion of the polymerization reaction such as polyoxyethylene glycol phosphate; or an antioxidant such as 2,6-di-t-butylparacresol is comprised. In addition, together with the reaction terminating agent, an additive that facilitates solution polymerization, for example, an additive such as a chelating agent, a dispersant, a pH adjuster, a deoxidizer, and an oxygen scavenger, may be further selectively used.

Step (S2) is a step for preparing a neodymium-catalyzed modified conjugated diene-based polymer by modifying or coupling an active polymer, and may be performed by reacting the active polymer and a modifier.

The modifier may be used in 0.5 mol to 20 mol with respect to 1 mol of the neodymium compound in the catalyst composition. Particularly, the modifier may be used in 1 mol to 10 mol with respect to 1 mol of the neodymium compound in the catalyst composition.

In addition, the modifier may be used in 0.01 parts by weight to 1.00 part by weight, particularly, 0.01 parts by weight to 0.50 parts by weight based on 100 parts by weight of the conjugated diene-based monomer.

In addition, the modification reaction may be performed at 0° C. to 90° C. for 1 minute to 5 hours.

After finishing the modification reaction, a polymerization terminating agent such as an organic acid and organophosphate may be added to be added to a reaction system to terminate polymerization reaction, and an antioxidant may be injected.

The preparation method according to an embodiment of the present invention may undergo desolvation treatment such as steam stripping to reduce the partial pressure of a solvent through the supply of vapor or vacuum drying treatment after step (S2) to obtain a modified conjugated diene-based polymer. In addition, in the reaction product obtained as the result of the reaction, unmodified active polymer may be included together with the modified conjugated diene-based polymer.

Rubber Composition and Molded Article

Furthermore, the present invention provides a rubber composition including the conjugated diene-based polymer, and a molded article manufactured from the rubber composition.

The rubber composition according to an embodiment of the present invention may include the neodymium-catalyzed modified conjugated diene-based polymer in 0.1 wt % or more to 100 wt % or less, particularly, 10 wt % to 100 wt %, more particularly, 20 wt % to 90 wt %. If the content of the modified conjugated diene-based polymer is less than 0.1 wt %, effects of improving abrasion resistance and crack resistance of a molded article manufactured by using the rubber composition, for example, a tire, may be insignificant.

Also, the rubber composition may further include another rubber component, if necessary, in addition to the modified conjugated diene-based polymer, and, in this case, the rubber component may be included in the content of 90 wt % or less based on the total weight of the rubber composition. Particularly, the rubber component may be included in 1 part by weight to 900 parts by weight based on 100 parts by weight of the modified conjugated diene-based copolymer.

The rubber component may be a natural rubber or a synthetic rubber, and, for example, the rubber component may be a natural rubber (NR) including cis-1,4-polyisoprene; a modified natural rubber, such as an epoxidized natural rubber (ENR), a deproteinized natural rubber (DPNR), and a hydrogenated natural rubber, in which the general natural rubber is modified or purified; and a synthetic rubber such as a styrene-butadiene rubber (SBR), polybutadiene (BR), polyisoprene (IR), a butyl rubber (IIR), an ethylene-propylene copolymer, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), a polysulfide rubber, an acrylic rubber, an urethane rubber, a silicon rubber, an epichlorohydrin rubber, and a halogenated butyl rubber. Any one thereof or mixtures of two or more thereof may be used.

In addition, the rubber composition may include 0.1 parts by weight to 150 parts by weight of a filler based on 100 parts by weight of the modified conjugated diene-based polymer, and the filler may include a silica-based filler, a carbon black-based filler, or a combination thereof. Particularly, the filler may be carbon black.

The carbon black-based filler is not particularly limited, but, for example, may have a nitrogen adsorption surface area per gram ($N_2SA$, measured according to JIS K 6217-2:2001) of 20 $m^2/g$ to 250 $m^2/g$. Also, the carbon black may have a dibutyl phthalate (DBP) oil absorption of 80 cc/100 g to 200 cc/100 g. If the nitrogen adsorption surface area per gram of the carbon black is greater than 250 $m^2/g$, the processability of the rubber composition may be reduced, and, if the nitrogen adsorption surface area per gram of the carbon black is less than 20 $m^2/g$, reinforcement by carbon black may be insignificant. Furthermore, if the DBP oil absorption of the carbon black is greater than 200 cc/100 g, the processability of the rubber composition may be reduced, and, if the DBP oil absorption of the carbon black is less than 80 cc/100 g, the reinforcement by carbon black may be insignificant.

Also, the silica is not particularly limited, but, for example, may include wet silica (hydrous silicic acid), dry silica (anhydrous silicic acid), calcium silicate, aluminum silicate, or colloidal silica. Particularly, the silica may be wet silica in which effects of improving both fracture characteristics and wet grip are the most significant. Furthermore, the silica may have a nitrogen adsorption surface area per gram ($N_2SA$) of 120 $m^2/g$ to 180 $m^2/g$, and a cetyltrimethylammonium bromide (CTAB) surface area per gram of 100 $m^2/g$ to 200 $m^2/g$. If the nitrogen adsorption surface area per gram of the silica is less than 120 $m^2/g$, reinforcement by silica may be reduced, and, if the nitrogen adsorption surface area per gram of the silica is greater than 180 m²/g, the processability of the rubber composition may be reduced. Also, if the CTAB surface area per gram of the silica is less than 100 m²/g, the reinforcement by silica, as the filler, may be reduced, and, if the CTAB surface area per gram of the silica is greater than 200 m²/g, the processability of the rubber composition may be reduced.

Meanwhile, if silica is used as the filler, a silane coupling agent may be used together for the improvement of reinforcement and low heat generation property.

Particular examples of the silane coupling agent may be bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyl trimethoxysilane, 3-mercaptopropyl triethoxysilane, 2-mercaptoethyl trimethoxysilane, 2-mercaptoethyl triethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazolyl tetrasulfide, 3-triethoxysilylpropyl benzolyl tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyl dimethoxymethylsilane, dimethoxymethylsilylpropyl-N,N-dimethylthiocarbamoyl tetrasulfide, or dimethoxymethylsilylpropyl benzothiazolyl tetrasulfide, and any one thereof or a mixture of two or more thereof may be used. More particularly, in consideration of the effect of improving the reinforcement, the silane coupling agent may be bis(3-triethoxysilylpropyl)polysulfide or 3-trimethoxysilylpropyl benzothiazyl tetrasulfide.

Also, the rubber composition according to the embodiment of the present invention may be sulfur cross-linkable, and, accordingly, may further include a vulcanizing agent.

The vulcanizing agent may particularly be sulfur powder, and may be included in 0.1 parts by weight to 10 parts by weight based on 100 parts by weight of the rubber component. If the vulcanizing agent is included within the above range, elastic modulus and strength required for a vulcanized rubber composition may be secured and, simultaneously, a low fuel consumption ratio may be obtained.

In addition, the rubber composition according to an embodiment of the present invention may further include various additives, such as a vulcanization accelerator, a process oil, a plasticizer, an antiaging agent, a scorch inhibitor, zinc white, stearic acid, a thermosetting resin, or a thermoplastic resin, used in the general rubber industry, in addition to the above-described components.

The vulcanization accelerator is not specifically limited, but, particularly, a thiazole-based compound, such as 2-mercaptobenzothiazole (M), dibenzothiazyl disulfide (DM), and N-cyclohexylbenzothiazole-2-sulfenamide (CZ), or a guanidine-based compound, such as diphenylguanidine (DPG), may be used. The vulcanization accelerator may be included in 0.1 parts by weight to 5 parts by weight based on 100 parts by weight of the rubber component.

Also, the process oil acts as a softener in the rubber composition, wherein the process oil may be a paraffin-based, naphthenic-based, or aromatic-based compound, and more particularly, the aromatic-based compound may be used in consideration of tensile strength and abrasion resistance, and the naphthenic-based or paraffin-based process oil may be used in consideration of hysteresis loss and low temperature characteristics. The process oil may be included in 100 parts by weight or less based on 100 parts by weight of the rubber component, and if the process oil is included in the above amount, decreases in tensile strength and low heat generation property (low fuel consumption ratio) of the vulcanized rubber may be prevented.

Furthermore, particular examples of the antiaging agent may be N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a high-temperature condensate of diphenylamine and acetone. The antiaging agent may be used in 0.1 parts by weight to 6 parts by weight based on 100 parts by weight of the rubber component.

The rubber composition according to an embodiment of the present invention may be obtained by kneading the above compounding formulation using a kneader such as a Banbury mixer, a roll, and an internal mixer, and a rubber composition having excellent abrasion resistance as well as low heat generation property may be obtained by a vulcanization process after molding.

Accordingly, the rubber composition may be suitable for the preparation of each member of a tire, such as a tire's tread, an under tread, a sidewall, a carcass coating rubber, a belt coating rubber, a bead filler, a chafer, and a bead coating rubber, or various industrial rubber products such as an anti-vibration rubber, a belt conveyor, and a hose.

The molded article manufactured by using the rubber composition may include a tire or a tire's tread.

EXAMPLES

Hereinafter, the present invention will be described in more detail, according to particular examples and experimental examples. However, the examples and experimental examples below are merely presented to exemplify the present invention, and the scope of the present invention is not limited thereto.

Preparation Example 1

(1) Preparation of ethyl 3-((3-morpholinopropyl)amino)propanoate 50 ml of an ethanol solution in which 10.3 g of ethyl acetate was dissolved was cooled to 0° C., and 15 g of (3-morpholinopropyl)amine was slowly injected so that the temperature was not raised to greater than 30° C. After finishing the injection, the reaction solution was stirred at 0° C. for 3 hours, and further stirred at room temperature (23±3° C.) for 24 hours. After finishing the reaction, volatile materials were removed under reduced pressure conditions to prepare ethyl 3-((3-morpholinopropyl)amino)propanoate.

(2) Preparation of ethyl 3-((3-morpholinopropyl)(trimethylsilyl)amino)propanoate 2.5 g of the ethyl 3-((3-morpholinopropyl)amino)propanoate prepared above was dissolved in an n-hexane solution, and 28.8 ml of triethylamine ($Et_3N$) was added, and then, the temperature was reduced to 0° C. After that, 15.8 ml of a trimethylsilyl chloride (TMSCl) solution was slowly injected thereto, and a reaction solution was stirred for 24 hours. After finishing the reaction, precipitated materials were removed using a filter, and volatile materials were removed under reduced pressure conditions. Through distillation under a reduced pressure, ethyl 3-((3-morpholinopropyl)(trimethylsilyl)amino)propanoate was prepared. The synthesis of the ethyl 3-((3-morpholinopropyl)(trimethylsilyl)amino)propanoate was identified through $^1H$ NMR.

¹H NMR (500 MHz, CDCl₃) 4.15 (m, 2H), 3.64 (m, 4H), 3.08 (m, 1H), 2.83 (m, 1H), 2.71 (m, 1H), 2.65 (m, 1H), 2.54 (m, 1H), 2.41 (m, 6H), 2.22 (m, 1H), 1.64 (m, 1H), 1.57 (m, 1H), 1.21 (m, 2H), 0.09 (m, 9H).

Preparation Example 2

(1) Preparation of ethyl 3-((3-thiomorpholinopropyl)amino)propanoate 50 ml of an ethanol solution in which 10.3 g of ethyl acetate was dissolved was cooled to 0° C., and 16 g of (3-thiomorpholinopropyl)amine was slowly injected so that the temperature was not raised to greater than 30° C. After finishing the injection, the reaction solution was stirred at 0° C. for 3 hours, and further stirred at room temperature (23±3° C.) for 24 hours. After finishing the reaction, volatile materials were removed under reduced pressure conditions to prepare ethyl 3-((3-morpholinopropyl)amino)propanoate.

(2) Preparation of ethyl 3-((3-thiomorpholinopropyl)(trimethylsilyl)amino)propanoate 2.6 g of the ethyl 3-((3-thiomorpholinopropyl)amino)propanoate prepared above was dissolved in an n-hexane solution, and 28.8 ml of triethylamine (Et₃N) was added, and then, the temperature was reduced to 0° C. After that, 15.8 ml of a trimethylsilyl chloride (TMSCl) solution was slowly injected thereto, and a reaction solution was stirred for 24 hours. After finishing the reaction, precipitated materials were removed using a filter, and volatile materials were removed under reduced pressure conditions. Through distillation under a reduced pressure, ethyl 3-((3-thiomorpholinopropyl)(trimethylsilyl)amino)propanoate was prepared. The synthesis of the ethyl 3-((3-thiomorpholinopropyl)(trimethylsilyl)amino)propanoate was identified through ¹H NMR.

¹H NMR (500 MHz, CDCl₃) 4.12 (m, 2H), 3.65 (m, 4H), 3.12 (m, 1H), 2.97 (m, 1H), 2.71 (m, 1H), 2.65 (m, 1H), 2.54 (m, 1H), 2.41 (m, 6H), 2.12 (m, 1H), 1.81 (m, 1H), 1.47 (m, 1H), 1.10 (m, 2H), 0.10 (m, 9H).

Preparation Example 3

(1) Preparation of ethyl 3-((2-(bis(2-methoxyethyl)amino)ethyl)amino)propanoate 50 ml of an ethanol solution in which 14 g of ethyl acetate was dissolved was cooled to 0° C., and 20 g of bis(2-methoxyethyl)amine was slowly injected so that the temperature was not raised to greater than 30° C. After finishing the injection, the reaction solution was stirred at 0° C. for 3 hours, and further stirred at room temperature (23±3° C.) for 24 hours. After finishing the reaction, volatile materials were removed under reduced pressure conditions to prepare ethyl 3-((2-(bis(2-methoxyethyl)amino)ethyl)amino)propanoate.

(2) Preparation of ethyl 3-((2-(bis(2-methoxyethyl)amino)ethyl) (trimethylsilyl)amino)propanoate 13.6 g of the 3-((2-(bis(2-methoxyethyl)amino)ethyl)amino)propanoate prepared above was dissolved in an n-hexane solution, and 48.8 ml of triethylamine (Et₃N) was added, and then, the temperature was reduced to 0° C. Then, 33.2 ml of a trimethylsilyl chloride (TMSCl) solution was slowly injected thereto, and a reaction solution was stirred for 24 hours. After finishing the reaction, precipitated materials were removed using a filter, and volatile materials were removed under reduced pressure conditions. Through distillation under a reduced pressure, ethyl 3-((2-(bis(2-methoxyethyl)amino)ethyl)(trimethylsilyl)amino)propanoate was prepared. The synthesis of the ethyl 3-((2-(bis(2-methoxyethyl)amino)ethyl)(trimethylsilyl)amino)propanoate was identified through ¹H NMR.

¹H NMR (500 MHz, CDCl₃) 4.02 (m, 2H), 3.55 (m, 4H), 3.28 (s, 3H), 3.22 (s, 3H), 2.94-2.89 (m, 1H), 2.64-2.59 (m, 1H), 2.51 (m, 4H), 2.38 (m, 1H), 1.07 (t, 2H), 0.08 (s, 9H).

Example 1

To a reactor in a vacuum state, 4.7 kg of a hexane solution in which 1,3-butadiene was dissolved was put, and the internal temperature of the reactor was raised to 70° C. A catalyst composition was added thereto, and polymerization was performed for 60 minutes. In this case, the catalyst composition was prepared by adding 0.719 mmol of neodymium versatate (Nd(2-ethylhexanoate)₃, Solvay Co.) to a n-hexane solvent, injecting diisobutylaluminum hydride (DIBAH) and diethylaluminum chloride (DEAC) in order so as to satisfy neodymium versatate:DIBAH:DEAC=1:9.5:2.4, and mixing. The modifier prepared in Preparation Example 1 was added in 0.2 parts by weight based on 100 parts by weight of 1,3-butadiene, and modification reaction was performed for 30 minutes (molar ratio of modifier:Nd=5:1). After that, HPSS (IC Chemical Co.) as a polymerization terminator and IR1520 (GASF Co.) as an antioxidant were respectively added in 0.10 parts by weight and 0.30 parts by weight based on 100 parts by weight of the monomer to terminate the reaction, solvents were removed through steam stripping, and drying was performed for minutes using a 6-inch hot roll (110° C.) to prepare a neodymium-catalyzed modified butadiene polymer.

Example 2

A neodymium-catalyzed modified butadiene-based polymer was prepared by the same method described in Example 1 except for adding a modifier in 0.1 parts by weight based on 100 parts by weight of 1,3-butadiene, in Example 1.

Example 3

A neodymium-catalyzed modified butadiene-based polymer was prepared by the same method described in Example except for using the modifier prepared in Preparation Example 2, in Example 1.

Example 4

A neodymium-catalyzed modified butadiene-based polymer was prepared by the same method described in Example except for using the modifier prepared in Preparation Example 3, in Example 1.

Comparative Example 1

A lithium-catalyzed modified butadiene-based polymer of BR1250H (Nippon Zeon) was used as a comparative material.

Comparative Example 2

A neodymium-catalyzed modified butadiene-based polymer was prepared by the same method described in Example 1 except for injecting as a catalyst composition in a molar ratio of neodymium versatate:DIBAH:DEAC=1:8.5:2.4 in order and mixing, and not performing modification reaction through the reaction with a modifier, in Example 1.

Experimental Example 1

Physical properties of each of the polymers of the Examples and the Comparative Examples were respectively measured by the methods below, and the results are listed in Table 1 below.

1) Microstructure Analysis

The cis 1,4-bond and 1,2-vinyl bond contents in each polymer were measured using Varian VNMRS 500 MHz NMR, and 1,1,2,2-tetrachloroethane D2 (Cambridge Isotope Co.) was used as a solvent.

2) Mooney Viscosity

Mooney viscosity (ML 1+4, @100° C.) of each polymer was measured before and after modification using MV2000E of Monsanto Co. with a large rotor at a rotor speed of 2±0.02 rpm at 100° C. In this case, a specimen was stood at room temperature (23±3° C.) for 30 minutes or more, 27±3 g was taken and filled in a die cavity, and mooney viscosity was measured while applying a torque by operating a platen. In addition, after measuring the mooney viscosity, the change of mooney viscosity was observed for 1 minute while releasing torque, and from the slope value thereof, −S/R (absolute value) was determined.

3) Modification Ratio (%)

Each polymer was dissolved in cyclohexane and stored in a mobile phase reservoir of a specimen (prepare in 1.0 mg/ml), and tetrahydrofuran (THF) was stored in another mobile phase reservoir. The mobile phase reservoirs were connected with a dual-head pump, respectively, and first, the solution in the mobile phase reservoir in which the polymer was dissolved was injected into a column filled with a silica absorbent through the pump and an injector with a loop volume of 100 μl. In this case, the pressure of the pump was 450 psi, and an injection flow rate was 0.7 ml/min. Then, after confirming that an unmodified butadiene polymer unit in the polymer from a detector (ELSD, Waters Co.) was not detected any more, based on 5 minutes from the initiation of the injection, the tetrahydrofuran was injected into the column through the pump. In this case, the pressure of the pump was 380 psi, and an injection flow rate was 0.7 ml/min. After confirming that a modified butadiene polymer unit in the polymer according to the injection of tetrahydrofuran from the detector was not detected any more, the injection of a second solvent was finished. Then, from the detected chromatogram results, a modification ratio (%) was calculated according to Mathematical Formula 1 below.

[Mathematical Formula 1]

$$\text{modification ratio (\%)} = \frac{\text{peak area of modified polymer}}{\text{peak area of unmodified polymer} + \text{peak area of modified polymer}} \times 100$$

In Mathematical Formula 1, the peak area of the unmodified polymer unit is the peak area of the chromatogram on a first solution transported to the detector, and the peak area of the modified polymer unit is the peak area of the chromatogram on a second solution transported to the detector.

TABLE 1

| Division | | Example 1 | Example 2 | Example 3 | Example 4 | Comparative Example 1 | Comparative Example 2 |
|---|---|---|---|---|---|---|---|
| Microstructure (wt %) | Cis 1,4-bond | 97.4 | 96.3 | 97.3 | 97.2 | 38.8 | 97.6 |
| | 1,2-vinyl bond | 0.4 | 0.4 | 0.4 | 0.4 | 9.4 | — |
| Mooney viscosity (ML1 + 4, @100° C.) | Before modification | 37.7 | 37.3 | 35.1 | 36.1 | — | 53.0 |
| | After modification | 52.1 | 50.5 | 50.1 | 51.2 | 56.0 | — |
| −S/R | Before modification | 0.777 | 0.786 | 0.791 | 0.788 | — | 0.801 |
| | After modification | 0.762 | 0.776 | 0.774 | 0.775 | 0.891 | — |
| Modification ratio (%) | | 23 | 22 | 21 | 22 | 34 | — |

As shown in Table 1, Example 1 to Example 4 showed modification ratios of 21-23%, and through this, it was confirmed that a polymer was modified by the modifier represented by Formula 1, and a functional group derived from the modifier was included in the polymer. Meanwhile, the modified butadiene polymer of Comparative Example 1 was prepared using a lithium compound catalyst composition and showed completely different properties from the microstructure of Example 1 to Example 4 prepared using neodymium compound catalyst compositions. Through this, it was confirmed that the properties of 96 wt % or more of the cis 1,4-bond are shown only in polymers prepared using a neodymium compound catalyst composition.

Experimental Example 2

After preparing rubber compositions and rubber specimens using the polymers prepared in the Examples and the Comparative Examples, 300% modulus, abrasion resistance and viscoelasticity properties (rolling resistance properties) were measured by the methods below. The results are shown in Table 2 below.

Particularly, 70 parts by weight of carbon black, 22.5 parts by weight of a process oil, 2 parts by weight of an antiaging agent (TMDQ), 3 parts by weight of zinc oxide (ZnO), and 2 parts by weight of stearic acid were compounded with 100 parts by weight of each of the polymers to prepare each rubber composition. Thereafter, 2 parts by weight of sulfur, 2 parts by weight of a vulcanization accelerator (CZ), and 0.5 parts by weight of a vulcanization accelerator (DPG)

were added to each rubber composition, and gently mixed at 50° C. for 1.5 minutes in 50 rpm and then, a vulcanized compound mixture in a sheet shape was obtained using a roll of 50° C. The vulcanized compound mixture was vulcanized at 160° C. for 25 minutes to prepare a rubber specimen.

1) 300% Modulus (kg·f/cm²)

After vulcanizing each rubber composition at 150° C. for t90 minutes, modulus if extended by 300% (M-300%) of a vulcanized material was measured based on ASTM D412.

2) Viscoelasticity Properties (Tan δ @50-70° C.)

With respect to tan δ properties that are the most important for a low fuel consumption ratio, a viscoelasticity coefficient (tan δ) was measured at a frequency of 10 Hz, a prestrain of 3%, and a dynamic strain of 3% at a temperature of 50-70° C. using DMTS 500N by Gabo Instruments, Germany, and an average value thereof was shown. In this case, the tan δ value at 50-70° C. represents rolling resistance properties, i.e., the fuel consumption ratio.

3) Abrasion Resistance (DIN Abrasion Test)

With respect to each rubber specimen, DIN abrasion test was performed based on ASTM D5963 and shown by DIN loss index (loss volume index: abrasion resistance index (ARIA), Method A)) based on the loss weight (mg) and the measured value of Comparative Example 2. The higher numerical value means better results.

TABLE 2

| Division | | Example 1 | Example 2 | Example 3 | Example 4 | Comparative Example 1 | Comparative Example 2 |
|---|---|---|---|---|---|---|---|
| Abrasion resistance | Loss weight (mg) | 19 | 19 | 18 | 17 | 24 | 20 |
| | DIN Index (%) | 105 | 105 | 111 | 118 | 83 | 100 |
| Tensile properties | M-300% (kgf/cm²) | 98 | 99 | 100 | 100 | 97 | 93 |
| | M-300% Index (%) | 105 | 106 | 108 | 108 | 104 | 100 |
| Viscoelasticity properties | Tan δ @50-70° C. (Avg.) | 0.124 | 0.129 | 0.128 | 0.125 | 0.126 | 0.157 |
| | Tan δ @50-70° C. Index (%) | 127 | 122 | 123 | 126 | 125 | 100 |

In Table 2 above, the index values were calculated by Mathematical Formula 2 or Mathematical Formula 3 below based on the index values of Comparative Example 2. The abrasion resistance and viscoelasticity properties were calculated by Mathematical Formula 3 below, and tensile properties were calculated by Mathematical Formula 2 below.

Index=(measured value/standard value)×100  [Mathematical Formula 2]

Index=(standard value/measured value)×100  [Mathematical Formula 3]

As shown in Table 2 above, it was confirmed that Examples 1 to 4 showed better viscoelasticity properties and markedly improved tensile properties and abrasion resistance when compared with Comparative Examples 1 and 2.

Particularly, Examples 1 to 4 showed equivalently excellent viscoelasticity properties and tensile properties and markedly improved abrasion resistance by 127% or more when compared with Comparative Example 1 in which a commercially available lithium-catalyzed modified butadiene polymer was applied, and when compared with Comparative Example 2, improved tensile properties and abrasion resistance by 5% or more, and markedly improved effects of viscoelasticity properties by 20% or more were shown.

From the results, it could be confirmed that the neodymium-catalyzed modified conjugated diene-based polymer according to the present invention shows excellent properties of tensile properties, abrasion resistance and viscoelasticity properties in balance by including a functional group derived from a modifier represented by Formula 1.

The invention claimed is:

1. A neodymium-catalyzed modified conjugated diene-based polymer comprising:
   a repeating unit derived from a conjugated diene-based monomer; and
   a functional group derived from a modifier represented by Formula 1 in at least one terminal of the neodymium-catalyzed modified conjugated diene-based polymer:

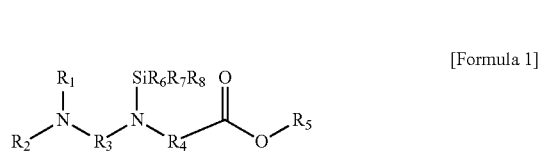

[Formula 1]

in Formula 1,
   $R_1$ and $R_2$ are each independently a monovalent hetero hydrocarbon group having 1 to 10 carbon atoms and at least one heteroatom selected from N, S or O; or $R_1$ and $R_2$ are connected with each other and together with N to which they are attached to form a heterocyclic group of 2 to 20 carbon atoms,
   $R_3$ and $R_4$ are each independently a divalent hydrocarbon group of 1 to 10 carbon atoms,
   $R_5$ is a monovalent hydrocarbon group of 1 to 10 carbon atoms, and
   $R_6$ to $R_8$ are each independently an alkyl group of 1 to 10 carbon atoms or an alkoxy group of 1 to 10 carbon atoms.

2. The neodymium-catalyzed modified conjugated diene-based polymer of claim 1, wherein, in Formula 1, $R_1$ and $R_2$ are each independently a heteroalkyl group having 1 to 6 carbon atoms and at least one heteroatom selected from N, S or O; or $R_1$ and $R_2$ are connected with each other and together with N to which they are attached to form a heterocyclic group of 3 to 10 carbon atoms, $R_3$ and $R_4$ are each independently an alkylene group of 1 to 6 carbon atoms, $R_5$ is an alkyl group of 1 to 6 carbon atoms, and $R_6$ to $R_8$ are each independently an alkyl group of 1 to 6 carbon atoms or an alkoxy group of 1 to 6 carbon atoms.

3. The neodymium-catalyzed modified conjugated diene-based polymer of claim 1, wherein, in Formula 1, $R_1$ and $R_2$ are each independently a heteroalkyl group having 1 to 3 carbon atoms and comprising O; or $R_1$ and $R_2$ are connected with each other and together with N to which they are attached to form a heterocyclic group of 3 to 6 carbon atoms, and the heterocyclic group further comprises O or S, $R_3$ and $R_4$ are each independently an alkylene group of 1 to 3 carbon atoms, $R_5$ is an alkyl group of 1 to 6 carbon atoms, and $R_6$ to $R_8$ are each independently an alkyl group of 1 to 3 carbon atoms.

4. The neodymium-catalyzed modified conjugated diene-based polymer of claim 1, wherein the modifier is one or more selected from the group consisting of compounds represented by Formula 1-1 to Formula 1-3:

[Formula 1-1]

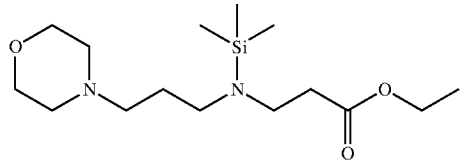

[Formula 1-2]

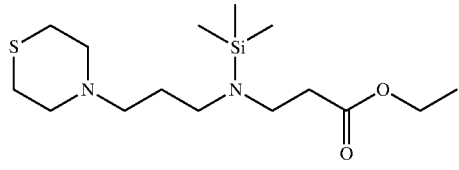

[Formula 1-3]

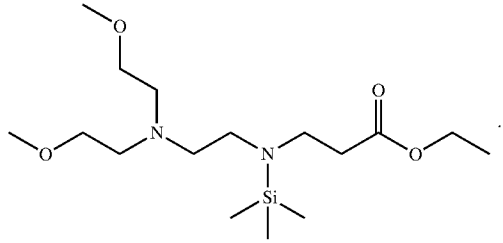

5. The neodymium-catalyzed modified conjugated diene-based polymer of claim 1, which has a cis-1,4-bond content of 96 wt % or more.

6. The neodymium-catalyzed modified conjugated diene-based polymer of claim 1, wherein a modification ratio is 20% or more, wherein the modification ratio is a value calculated according to Mathematical Formula 1 using a chromatogram obtained from a measurement of chromatography:

[Mathematical Formula 1]
$$\text{modification radio (\%)} = \frac{\text{peak area of modified polymer}}{\text{peak area of unmodified polymer} + \text{peak are of modified polymer}} \times 100$$

wherein the peak area of unmodified polymer is a peak area of the chromatogram on a first solution transported to a detector, and the peak area of modified polymer is a peak area of the chromatogram on a second solution transported to the detector.

7. A method for preparing the neodymium-catalyzed modified conjugated diene-based polymer of claim 1, comprising:

polymerizing the conjugated diene-based monomer in the presence of a catalyst composition comprising a neodymium compound in a hydrocarbon solvent to prepare an active polymer; and reacting the active polymer with the modifier.

8. The method of claim 7, wherein the modifier is one or more selected from the group consisting of compounds represented by Formula 1-1 to Formula 1-3:

[Formula 1-1]

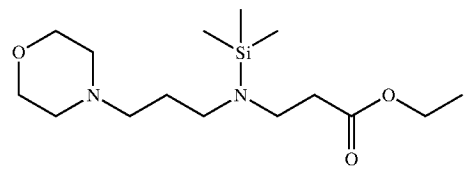

[Formula 1-2]

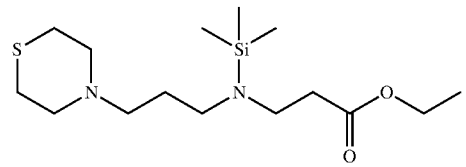

[Formula 1-3]

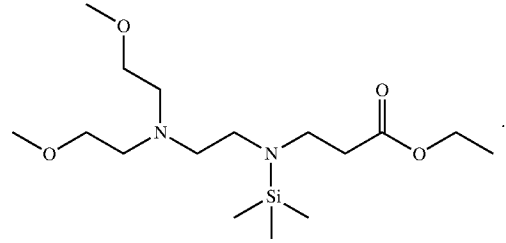

9. The method of claim 7, wherein the modifier is used in 0.01 parts by weight to 1.00 part by weight based on 100 parts by weight of the conjugated diene-based monomer.

10. The method of claim 7, wherein the neodymium compound is represented by Formula 2:

[Formula 2]

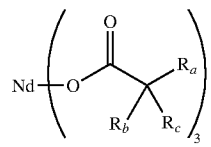

in Formula 2, $R_a$ to $R_c$ are each independently hydrogen or an alkyl group of 1 to 12 carbon atoms, provided that $R_a$ to $R_c$ are not all hydrogen.

11. The method of claim 7, wherein the catalyst composition comprises at least one of an alkylating agent, a halide or a second conjugated diene-based monomer.

12. A rubber composition comprising the neodymium-catalyzed modified conjugated diene-based polymer of claim 1, and a filler.

13. The rubber composition according to claim 12, wherein the filler is included in an amount of 0.1 parts by weight to 150 parts by weight based on 100 parts by weight of the neodymium-catalyzed modified conjugated diene-based polymer.

14. The neodymium-catalyzed modified conjugated diene-based polymer of claim 1, wherein a modification ratio is 20% or more and 60% or less, wherein the modification ratio is a value calculated according to Mathematical Formula 1 using a chromatogram obtained from a measurement of chromatography:

[Mathematical Formula 1]
$$\text{modification radio (\%)} = \frac{\text{peak area of modified polymer}}{\text{peak area of unmodified polymer} + \text{peak are of modified polymer}} \times 100$$

wherein the peak area of unmodified polymer is a peak area of the chromatogram on a first solution transported to a detector, and the peak area of modified polymer is a peak area of the chromatogram on a second solution transported to the detector.

* * * * *